(12) United States Patent
Hirtzlin et al.

(10) Patent No.: US 6,512,428 B1
(45) Date of Patent: Jan. 28, 2003

(54) DEVICE FOR THE SIMULTANEOUS RECEPTION/TRANSMISSION OF SIGNALS COMPRISING A LOW-NOISE AMPLIFIER

(75) Inventors: Patrice Hirtzlin, Rennes (FR); Jean-Yves Le Naour, Pace (FR); Patrick Wurm, Comberton (GB)

(73) Assignee: Thomson Licensing S.A., Boulogne (FR)

( * ) Notice: Subject to any disclaimer, the term of this patent is extended or adjusted under 35 U.S.C. 154(b) by 16 days.

(21) Appl. No.: 09/696,423

(22) Filed: Oct. 25, 2000

(30) Foreign Application Priority Data

Oct. 25, 1999 (FR) .............................. 99 13269

(51) Int. Cl.$^7$ .............................. H03H 7/38; H03H 7/46
(52) U.S. Cl. ...................................... 333/132; 333/124
(58) Field of Search .................................. 333/132, 133, 333/202, 124; 455/82, 83, 75

(56) References Cited

U.S. PATENT DOCUMENTS 5,467,065 A * 11/1995 Turunen et al. ............. 333/132
5,473,295 A   12/1995 Turunen ..................... 333/132
5,963,854 A   10/1999 Andreasson et al. .......... 455/82

OTHER PUBLICATIONS

Aparin et al Effect of Out–Of–Band Terminations on Distortion in Common–Emiter Circuits, Microwave Symposium Digest, 1999 IEEE MTTS, vol. 3, Jun. 13–19, 1999, pp. 977–980.

* cited by examiner

*Primary Examiner*—Robert Pascal
*Assistant Examiner*—Dean Takaoka
(74) *Attorney, Agent, or Firm*—Joseph S. Tripoli; Kuniyuki Akiyama

(57) ABSTRACT

The invention comprises a low-noise amplifier of the type comprising a transistor exhibiting a saturation phase for signals of high amplitude. According to the invention, at the output of the amplifier is arranged a load impedance referring back to this output an optimal impedance for maximizing the power at the output of the transistor and an open circuit in the reception frequency band. Thus, the entire parasitic signal is "boxed in" by the load impedance. Particular application in the field of bidirectional transmissions, especially transmission systems linking a terminal comprising the device according to the invention with at least one satellite or a terrestrial base station.

12 Claims, 2 Drawing Sheets

DEVICE FOR THE SIMULTANEOUS RECEPTION/TRANSMISSION OF SIGNALS COMPRISING A LOW-NOISE AMPLIFIER

FIELD OF THE INVENTION

The invention relates to the field of the simultaneous reception/transmission of signals in a transmission system with a transmitter and a receiver. It relates more particularly to a device for receiving/transmitting signals in a transmission system linking a terminal comprising the device according to the invention with a satellite or a terrestrial base station.

DESCRIPTION OF THE RELATED ART

Nowadays, remote transmission systems implementing the technique known as frequency division bidirectional transmission ("Frequency Division Duplex" or "FDD") are commonly used, but not exclusively, in the field of bidirectional satellite transmissions.

Since transmission and reception are simultaneous and since the level of the transmission signal is high in such a reception/transmission device, the reception path is disturbed by a parasitic signal created by coupling by the transmission signal transmitted over the transmission path owing to the considerable power at the output of the transmitter amplifier. This parasitic signal might saturate the input stage of the reception path (often consisting of a transistor whose drain current and bias voltage are low) and hence might disturb its proper operation. This problem is accentuated in the case of transmission employing digital modulations with a non-constant envelope exhibiting considerable instantaneous peak amplitudes, for example of the code division multiplex access type ("CDMA"). FIG. 1 diagrammatically represents the input/output architecture of a reception/transmission device, coupled to an antenna 1. The signal received by the antenna is transmitted to an input stage represented by a low-noise amplifier 2 ("LNA") whereas the output stage is represented by a solid-state power amplifier 3 ("SSPA") delivering the signal to be transmitted to the antenna. A dashed arrow diagrammatically shows the parasitic coupling between the two paths, which is created by the transmission signal on the reception signal.

To remedy this problem of parasitic coupling, a common technique consists in carrying out very effective filtering of the transmission signal so as to eliminate the coupling of the latter in the reception path. Conventionally, a diplexer including very selective band-pass filters makes it possible to isolate respectively the transmission and reception frequency bands. This solution has the advantage of effectively separating the two frequency bands. However, additional in-line losses are brought about at the input of the low-noise amplifier, resulting in a degradation of the noise factor of the reception path.

SUMMARY OF THE INVENTION

The invention avoids the prior art problems and to optimize the performance of the input stage of a signal reception/transmission device such as cited hereinabove.

To this end, the invention is a device for the simultaneous reception/transmission of signals in a transmission system with a transmitter and a receiver, the device comprising a reception path for receiving a reception signal occupying a reception frequency band and a transmission path for transmitting a transmission signal occupying a transmission frequency band, the said reception and transmission bands being disjoint, the reception path comprising a low-noise amplification stage comprising means for amplifying the reception signal, the operating characteristic of these means being linear for an amplitude range of the input signal and exhibiting saturation onwards of an amplitude of a given input signal, the said device being characterized in that an optimal load impedance is defined for linear behaviour of the amplification means, means are arranged at the output of these amplification means for referring back to this output on the one hand an open circuit in the reception frequency band and on the other hand an impedance equal to the optimal load impedance in the transmission frequency band.

Thus, the invention makes it possible to minimize the degradation brought about by the parasitic signal originating from the transmission path at the transmission frequency, which may be of relatively considerable power. The constraints relating to the filtering of the parasitic signals in the transmission band may then be less strict upstream of the reception chain. If the isolation between the transmission and reception paths is sufficient, there is no longer any need to carry out filtering at the input of the low noise amplification stage. In any event, the ohmic losses of the input filter are reduced due to the relaxing of the constraints on this filter, thus making it possible to improve the overall noise factor of the reception chain.

According to one embodiment, first filtering means arranged on the reception path are adapted for referring back to the output of the amplification means an open circuit in the transmission frequency band and an impedance matched to that of the transmission path in the reception frequency band.

According to one embodiment, the said first filtering means comprise a band-pass filter centred on the reception frequency and whose bandwidth is the reception frequency band.

According to one embodiment, the first filtering means comprise a band-stop filter which cuts off the transmission frequency band.

According to one embodiment, second filtering means, such as a band-stop filter, are arranged at the input of the amplification means for cutting off the transmission frequency band.

The invention concerns also a terminal for communication with at least one satellite or a terrestrial base station, of the type comprising an antenna, characterized in that it comprises the device according to the invention.

BRIEF DESCRIPTION OF THE DRAWINGS

Other characteristics and advantages of the present invention will emerge from the description of the exemplary embodiments which will follow, taken by way of non-limiting examples, with reference to the appended figures in which.

DETAILED DESCRIPTION OF THE INVENTION

To simplify the description, the same references will be used to designate elements fulfilling identical functions.

Figure 1:
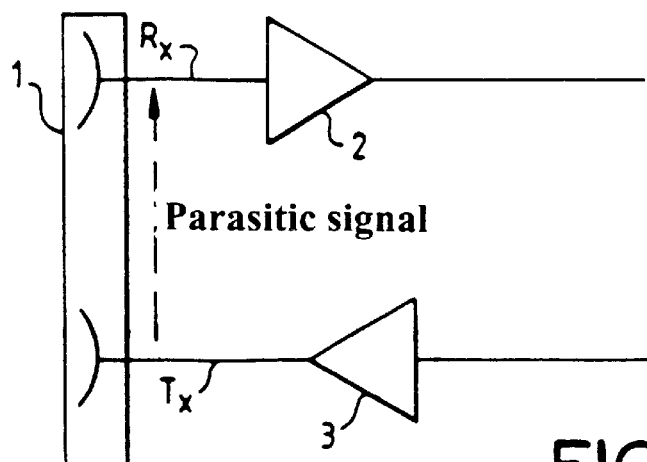
FIG. 1, already described, diagrammatically represents the input/output architecture of a reception/transmission device coupled to an antenna.
Figure 2:
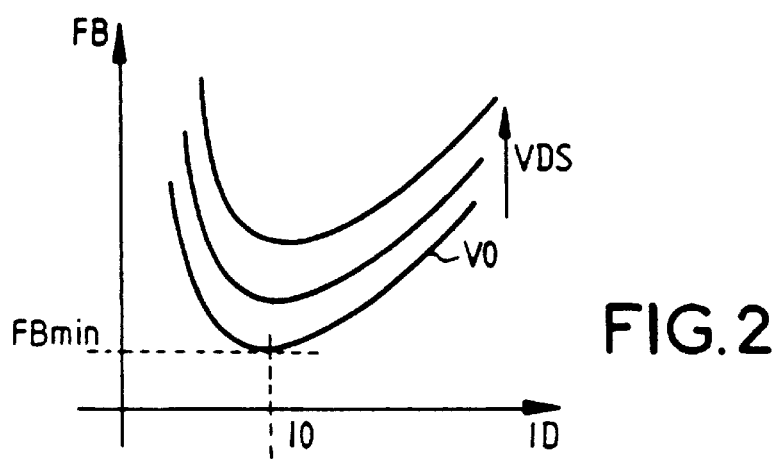
FIG. 2 represents the changes in the noise factor of a field effect transistor ("FET") as a function of the static bias point.

In a standard reception chain coupled to a reception antenna, the losses introduced at the input, such as those generated by the connections and the filtering elements, as well as the noise factor of the low-noise amplification stage must be minimized. For example, in the case of a low-noise amplifier constructed around an FET transistor, the bias current/voltage pair (I0, V0) defining the static bias point of the transistor is obtained for a noise factor minimum, such as illustrated in FIG. 2.

Figure 3:
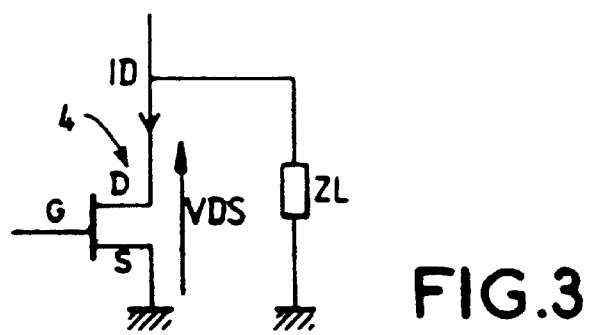
FIG. 3 represents a diagram of an FET transistor.

FIG. 3 represents an FET transistor 4 having the role of low-noise amplifier of the input stage. Maximization of the power delivered to the load impedance ZL of the transistor is obtained by choosing the value of the load impedance ZL substantially equal to V0/I0 (neglecting the saturation voltage $VD_{sat}$ of the FET transistor).

Figure 4:
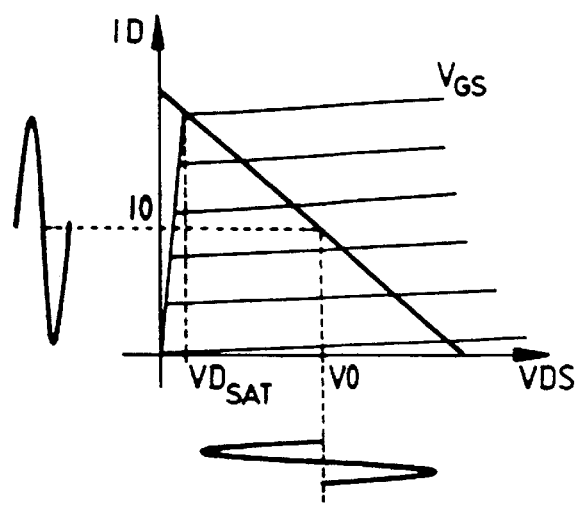
FIG. 4 represents the optimum load line for an FET transistor.

FIG. 4 represents the optimum load line obtained for the operation of the FET transistor. For a load impedance ZL fixed, as specified previously, at a value of V0/I0, the excursion on the VDS amplitude axis and on the ID amplitude axis is maximal and the power delivered to the load is maximal.

By way of example, in the Ku band corresponding to the [12.4 GHz; 18 GHz] frequency band, the bias current is typically a few milliamperes (i.e. 10 mA for example) for a voltage VDS (drain/source voltage) of the order of 2 volts (this leading to an optimal load impedance of 200Ω). For such a bias point, neglecting the saturation voltage $VD_{SAT}$, the maximum power Pmax deliverable by the transistor when presented with an optimal output impedance (corresponding to a maximal excursion in terms of current and voltage around the bias point) is given by:

$$Pmax(dBm)=10 \log(0.5*2.10*10^{-3})=-20 \text{ dBW}=10 \text{ dBm}.$$

Since the power levels of the parasitic signal transmitted by the transmission stage which are coupled to the input of the low-noise amplifier are in general incompatible with this latter value, the transistor will not operate in the linear regime and will be forced into the saturation regime.

Figure 5:
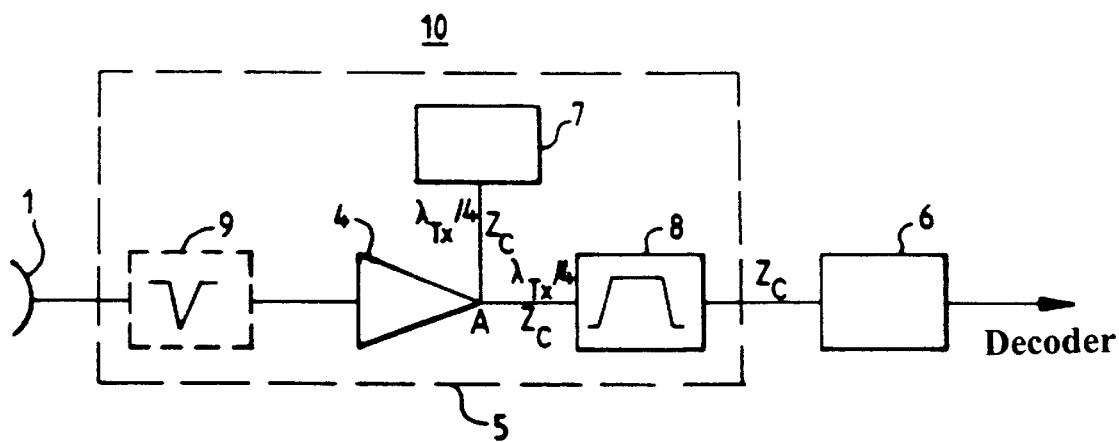
FIG. 5 represents the device of the invention according to one embodiment.

FIG. 5 represents the device 5 of the invention according to one embodiment, incorporated into a communication terminal 10. This terminal can be used to transmit to and receive the signals from a geostationary satellite, or from a constellation of satellites, for example in low orbit, or from a terrestrial base station.

The reception antenna 1 is linked to an input of the device 5, an output of which is linked to a stage 6 for converting frequencies into intermediate frequencies delivering a signal to a decoder (not represented).

The input of the device 5 is linked to the transistor 4 (of the type of that of FIG. 3) amplifying the signal received by the antenna. The output of the transistor is on the one hand linked to a load impedance 7 and on the other hand linked to a band-pass filter 8 whose output is the output of the device 5.

In this instance, the load impedance 7 is a band-pass filter centred on the central transmission frequency Tx allowing through the transmission band $B_{Tx}$. This filter is devised in such a way as to have an impedance close to a short circuit in the reception band $B_{Rx}$ and a characteristic impedance of 50Ω in the transmission band. The impedance of this filter is referred back to the output A of the transistor by a microstrip line segment with characteristic impedance of value 100Ω and with length $\lambda_{Tx}/4$, $\lambda_{Tx}$ corresponding to the wavelength of the signal transmitted on the transmission path. This line segment makes it possible to transform the impedance $Z_{LOAD}$ of the filter 7 at the point A according to the following formula:

$$Z_A = Z_C^2 / Z_{LOAD} = 100^2/50 = 200\Omega.$$

Thus, the 50Ω impedance 7 refers back to the point A an impedance of 200Ω which is optimal in the transmission band (cf. above calculation of the optimal impedance for the static bias point of the transistor). In this way, the operation of the transistor is optimized in its linear operating band and the current/voltage excursion at the output is maximal, thereby maximizing the power available at the output of the transistor in the transmission band. The energy received by the transistor in the transmission band of the parasitic signal is thus transmitted to the load impedance. Moreover, the short circuit exhibited by the impedance 7 in the reception band refers back to the point A an open circuit in this same band, thereby preventing any transmission of signal in the reception band to the impedance 7.

The component of the signals corresponding to the parasitic transmission signal introduces a minimum of disturbance at the level of the input stage. The transistor can deliver a signal of maximum amplitude without its performance being degraded in terms of noise factor.

In parallel with this, the band-pass filter 8 is centred on the central reception frequency allowing through the reception band Rx. This filter 8 is devised in such a way as to have an impedance close to a short circuit in the transmission band $B_{Tx}$ and a characteristic impedance of 50Ω in the reception band. This filter is referred back to the output A of the transistor by a $\lambda_{Tx}/4$ matched microstrip line segment, $\lambda_{Tx}$ corresponding to the wavelength of the signal transmitted on the transmission path. The $\lambda_{Tx}/4$ line segment plays the role of impedance inverter. Thus, the short circuit exhibited by the filter 8 in the transmission band is referred back at the point A to an open circuit in this same band, thereby preventing any transmission of signal in the transmission band to the band-pass filter.

According to a variant represented in FIG. 5 by dashes, a band-stop filter 9 is arranged between the input of the device 5 and the input of the transistor 4 with a view to at least partially eliminating the parasitic signal in the transmission frequency band.

In order to help with construction, bulk and cost, the filters 7 and 8 and the line segments are constructed using microstrip technology known per se.

Of course, the invention is not limited to the embodiment described above.

Thus, a transistor has been taken as amplification means. Any other type of amplification means, especially one having a linear operating characteristic for an amplitude range of the input signal and saturation of this characteristic onwards of an amplitude of the input signal.

Likewise, the signals exchanged within the framework of the transmission system could be analogue or digital.

What is claimed is:

1. A device for the simultaneous reception/transmission of signals in a transmission system with a transmitter and a receiver, the device comprising a reception path for receiving a reception signal occupying a reception frequency band and a transmission path for transmitting a transmission signal occupying a transmission frequency band, the said reception and transmission bands being disjoint, the reception path comprising a low-noise amplification stage comprising means for amplifying the reception signal, the operating characteristic of these means being linear for an amplitude range of the input signal and exhibiting saturation onwards of an amplitude of a given input signal, wherein:

an optimal load impedance is defined for linear behaviour of the amplification means, impedance adaptation means are arranged at the output of these amplification means for referring back to this output on the one hand an open circuit in the reception frequency band and on the other hand an impedance equal to the optimal load impedance in the transmission frequency band.

2. The device according to claim 1, wherein second filtering means are arranged at the input of the amplification means for cutting off the transmission frequency band.

3. The device according to claim 1, further comprising first filtering means arranged on the reception path are adapted for referring back to the output of the amplification means an open circuit in the transmission frequency band and an impedance matched to that of the transmission path in the reception frequency band.

4. The device according to claim 3, wherein the first filtering means comprise a band-stop filter which cuts off the transmission frequency band.

5. The device according to claim 3, wherein the said first filtering means comprise a band-pass filter centred on the reception frequency and whose bandwidth is the reception frequency band.

6. The device according to claim 3 wherein second filtering means are arranged at the input of the amplification means for cutting off the transmission frequency band.

7. Terminal for communication with at least one satellite or a terrestrial base station, of the type comprising an antenna, the terminal comprising a device for the simultaneous reception/transmission of signals in a transmission system with a transmitter and a receiver, the device comprising a reception path for receiving a reception signal occupying a reception frequency band and a transmission path for transmitting a transmission signal occupying a transmission frequency band, the said reception and transmission bands being disjoint, the reception path comprising a low-noise amplification stage comprising means for amplifying the reception signal, the operating characteristic of these means being linear for an amplitude range of the input signal and exhibiting saturation onwards of an amplitude of a given input signal, wherein:

an optimal load impedance is defined for linear behaviour of the amplification means, impedance adaptation means are arranged at the output of these amplification means for referring back to this output on the one hand an open circuit in the reception frequency band and on the other hand an impedance equal to the optimal load impedance in the transmission frequency band.

8. The terminal of claim 7 wherein second filtering means are arranged at the input of the amplification means for cutting off the transmission frequency band.

9. The terminal of claim 7 further comprising first filtering means arranged on the reception path are adapted for referring back to the output of the amplification means an open circuit in the transmission frequency band and an impedance matched to that of the transmission path in the reception frequency band.

10. The terminal of claim 9 wherein the said first filtering means comprise a band-pass filter centred on the reception frequency and whose bandwidth is the reception frequency band.

11. The terminal of claim 9 wherein the first filtering means comprise a band-stop filter which cuts off the transmission frequency band.

12. The terminal of claim 9 wherein second filtering means are arranged at the input of the amplification means for cutting off the transmission frequency band.

* * * * *